United States Patent
Amis et al.

(10) Patent No.: US 7,639,652 B1
(45) Date of Patent: Dec. 29, 2009

(54) INTER-CHANNEL BRIDGE NODE COMMUNICATIONS PROTOCOL FOR TDMA NETWORKS

(75) Inventors: Alan D. Amis, Plano, TX (US);
Lawrence C. Creech, Plano, TX (US);
James A. Stevens, Lucas, TX (US);
Hersh B. Parekh, Plano, TX (US)

(73) Assignee: Rockwell Collins, Inc., Cedar Rapids, LA (US)

( * ) Notice: Subject to any disclaimer, the term of this patent is extended or adjusted under 35 U.S.C. 154(b) by 403 days.

(21) Appl. No.: 11/237,636

(22) Filed: Sep. 28, 2005

(51) Int. Cl.
*H04J 3/00* (2006.01)
(52) U.S. Cl. .................... 370/337; 370/256; 370/238; 370/400; 370/331; 370/335; 455/455; 455/453; 455/450; 455/519; 709/228; 709/238; 709/239
(58) Field of Classification Search ............... 370/28, 370/329, 256, 238, 400, 331, 335; 455/41.2, 455/445, 453, 450, 519; 709/228, 238, 239
See application file for complete search history.

(56) References Cited

U.S. PATENT DOCUMENTS

| | | | | |
|---|---|---|---|---|
| 6,600,754 | B1 * | 7/2003 | Young et al. | 370/459 |
| 6,829,222 | B2 * | 12/2004 | Amis et al. | 370/238 |
| 7,103,371 | B1 * | 9/2006 | Liu | 370/348 |
| 7,299,038 | B2 * | 11/2007 | Kennedy et al. | 455/422.1 |
| 2001/0002912 | A1 * | 6/2001 | Tony et al. | 370/487 |
| 2002/0034182 | A1 * | 3/2002 | Mallory | 370/394 |
| 2005/0152305 | A1 * | 7/2005 | Ji et al. | 370/328 |
| 2006/0045066 | A1 * | 3/2006 | Choi et al. | 370/351 |
| 2007/0171876 | A1 * | 7/2007 | Malik et al. | 370/336 |
| 2007/0253345 | A1 * | 11/2007 | Habetha et al. | 370/254 |

OTHER PUBLICATIONS

Ad hoc protocol list; from Wikipedia; http://en.wikipedia.org/wiki/Ad_hoc_protocol_list: Aug. 1, 2005.

* cited by examiner

*Primary Examiner*—Lester Kincaid
*Assistant Examiner*—Mehmood B Khan
(74) *Attorney, Agent, or Firm*—Matthew J. Evans; Daniel M. Barbieri

(57) ABSTRACT

An improved protocol for MANETs used in TDRS, JTRS systems and the like, where multiple channels have multiple communication links operating simultaneously within range of each other. All nodes in such MANETs are able to communicate with all their "1 hop" neighbors, even if the neighbors are on different channels. An improved inter-channel communication protocol using a bridge node allows nodes on separate channels to communicate. The bridge node operates as a pseudo-bi-directional link between two neighboring channels in the MANET. An Inter-Channel Bridge Node Communication Protocol determines contention free time slots on both channels, and then reserves one time slot to be used for inter-channel communications. The reserved time slot usage is then divided between the transmitted bridge node and the receiving node in the neighboring channel.

22 Claims, 11 Drawing Sheets

INTER-CHANNEL BRIDGE NODE COMMUNICATIONS PROTOCOL FOR TDMA NETWORKS

CROSS-REFERENCE TO RELATED APPLICATIONS

[none]

BACKGROUND OF THE INVENTION

1. Field of Invention

The present invention relates generally to the field of ad hoc protocols for routing packets between computing devices in a mobile ad-hoc network (MANET) using Time Division Multiple Access (TDMA), and in particular MANETs used for military applications such as the Joint Tactical Radio System (JTRS).

2. Description of Related Art

A mobile ad-hoc network (MANET) is a self-configuring network of mobile router nodes, e.g. wireless laptop personal computers but including airborne, fixed, maritime, vehicular, dismounted and handheld applications, forming a topology. The router nodes may organize themselves in a peer-to-peer, computer-to-computer manner without the use of a central base station (access point).

A mobile ad-hoc network node does not need a priori knowledge of the topology of the network around it. A new node introduced into an MANET can discover the topology by announcing its presence and listening for corresponding announcements from its neighbor nodes. A new node can learn about new near nodes and how to reach them; the new node can announce that it can also reach those nodes. As time progresses each node may know about all other nodes and ways how to reach them. Nodes may grow into the MANET and die from it.

In practice, routing from one node to another in a MANET typically requires an "on-demand routing protocol" such as DSR (Dynamic Source Routing), or AODV (Ad Hoc On Demand Distance Vector). Typical routing protocols necessitate that they: keep routing table reasonably small; choose the best route for a given destination (e.g., based on a quality of service factor such as being the fastest route, most reliable route, highest throughput route, cheapest route or the like); keep routing tables up-to-date when nodes die, move or are added to the MANET; and require a small number of messages or time to converge new nodes into the network and initialize the network.

Numerous ad-hoc network routing protocols have been proposed in the literature, and have been classified into various categories, such as: pro-active (Table-driven); reactive (on-demand); hierarchical; geographical; power aware; multicast; or geographical multicast (geocast).

MANETS may be used in systems such as TDRS (Tactical Data Radio System) and JTRS (Joint Tactical Radio System), such as used for software defined radio (SDR). Historically some of the earliest MANETS were called "packet radio" networks, sponsored by DARPA in the 1970s.

SDR (Software Defined Radio) creates radios that function like computers, where the functionality of a radio is defined by software that can be upgraded, rather than by fixed hardware. SDR has been defined as a radio whose signal processing functionality is defined in software; where the waveforms are generated as sampled digital signals, converted from digital to analog via a high speed Digital-to-Analog Converter (DAC) and then translated to Radio Frequency (RF) for wireless propagation to a receiver. The receiver typically employs an RF subsystem coupled to a high speed Analog to Digital Converter (ADC) that can capture some or all of the channels of the software radio node. The receiver then extracts and demodulates the channel waveform using software executing on a digital processor.

SDR is aimed at solving several of the challenges of over-the-air communications, including compatibility with pre-existing legacy radio systems, ability to emulate transmission and reception of a plurality of different waveforms or forms of modulation (modem control), and more efficient spectrum usage, including operation in different frequency bands, with the lowest possibility of interception, detection and interference from unauthorized parties. The US military through the Department of Defense (DoD) has driven the development of next generation SDR with an Open Standard Architecture standard for implementing Joint Tactical Radio Systems (JTRS), which is used to communicate in military communication systems, through the use of an open standard Software Communications Architecture (SCA). The SCA calls out the following features: a Common Open Architecture; the ability to support multiple domains, including airborne, fixed, maritime, vehicular, dismounted and handheld applications; the ability to operate in multiple frequency bands; compatibility with legacy radio systems; the easy ability to upgrade new technologies to improve performance; enhanced security, including cryptographic capability, user identification and authentication, encryption key management, and multiple independent levels of security classification; networking ability, including support for legacy network protocols; software reusability; and support for plug-and-play and real-time reconfigurability, with waveforms being portable from one implementation to another.

SUMMARY OF THE INVENTION

Accordingly, an aspect of the present invention is to provide an improved protocol for MANETS used in TDRS, JTRS systems and the like, where multiple channel groups have multiple communication links operating simultaneously within range of each other. All nodes in such MANETs need to be able to communicate with all their "1 hop" neighbors, even if the neighbors are on different channels. An improved inter-channel communication protocol using an inter-channel bridge node allows nodes on separate channels to communicate via Time Division Multiple Access (TDMA). The bridge node operates as a pseudo-bi-directional link between two neighboring channels in a MANET. An Inter-Channel Bridge Node Communication Protocol determines contention free time slots on both channels, and then reserves one time slot to be used for inter-channel communications. The reserved time slot usage is then divided between the transmitted bridge node and the receiving node in the neighboring channel.

The sum total of all of the above advantages, as well as the numerous other advantages disclosed and inherent from the invention described herein, creates an improvement over prior techniques.

The above described and many other features and attendant advantages of the present invention will become apparent from a consideration of the following detailed description when considered in conjunction with the accompanying drawings.

BRIEF DESCRIPTION OF THE DRAWINGS

Detailed description of preferred embodiments of the invention will be made with reference to the accompanying drawings. Disclosed herein is a detailed description of the best presently known mode of carrying out the invention. This description is not to be taken in a limiting sense, but is made merely for the purpose of illustrating the general principles of the invention. The section titles and overall organization of the present detailed description are for the purpose of convenience only and are not intended to limit the present invention.

Figure 1B:
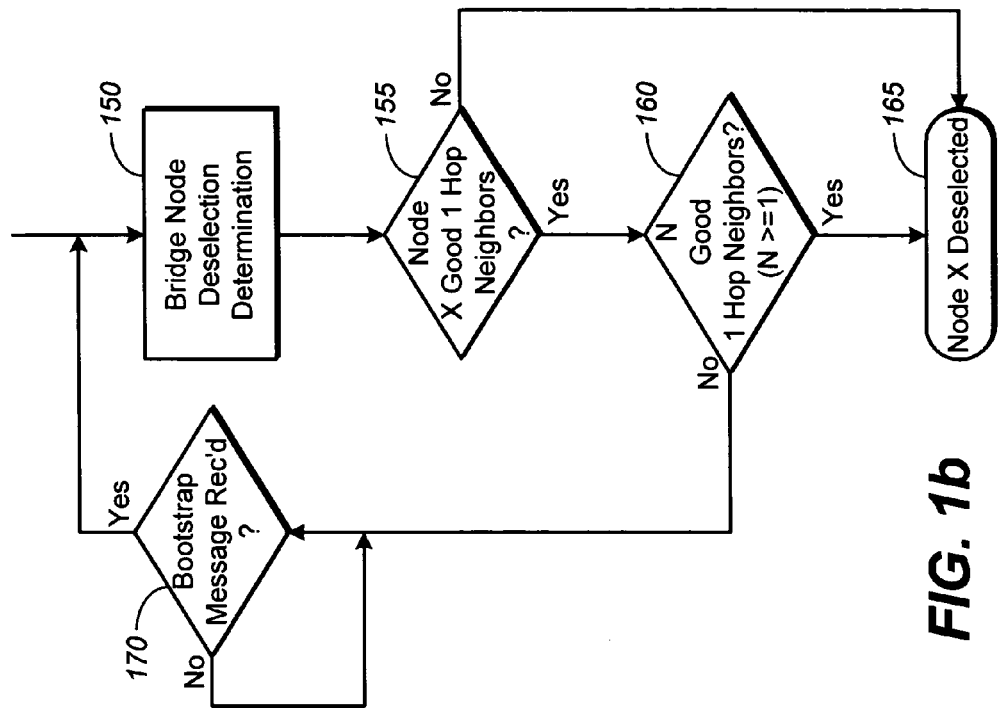
FIG. 1(b) is a flowchart illustrating how to deselect a bridge node in a channel group.

It should be understood that one skilled in the art may, using the teachings of the present invention, vary embodiments shown in the drawings without departing from the spirit of the invention herein. In the figures, elements with like numbered reference numbers in different figures indicate the presence of previously defined identical elements.

DETAILED DESCRIPTION OF THE INVENTION

An aspect of the present invention is to provide an improved protocol for a MANET architectures used in TDRS, JTRS systems and the like, where multiple channels (channel groups) have multiple communication links operating simultaneously within range of each other. The channel group (CG) can be a particular implementation of the nodes, having a particular frequency the nodes communicate with one another in the channel. Channel Group refers to a Logical Channel; while all nodes will have a particular frequency hopping pattern, those that share the same Logical Channel or Channel Group will have the very same hopping pattern. Thus if two nodes are on the same CG (logical channel), they will have the same hopping frequency pattern and will be able to communicate with one another.

All nodes in such MANETs need to be able to communicate with all their "1 hop" neighbors, even if the neighbors are on different channels or CGs. The term "1 hop" is used to refer to all nodes that are within transceiver range. That is to say, a node can communicate with a 1 hop neighbor with a single transmission, and no multi-hop transmissions are required. In the present invention an improved inter-channel communication protocol using a bridge node allows nodes on separate channels to communicate. The bridge node operates as a pseudo-bi-directional link between two neighboring channels in the MANET. An Inter-Channel Bridge Node Communication Protocol determines contention free time slots on both channels, and then reserves one time slot to be used for inter-channel communications. Time slots are used as preferably the nodes in different channels communicate with one another using data messages that are time division multiplexed, such as by TDMA. The reserved time slot usage is then divided between the transmitted bridge node and the receiving node in the neighboring channel.

Figure 1A:
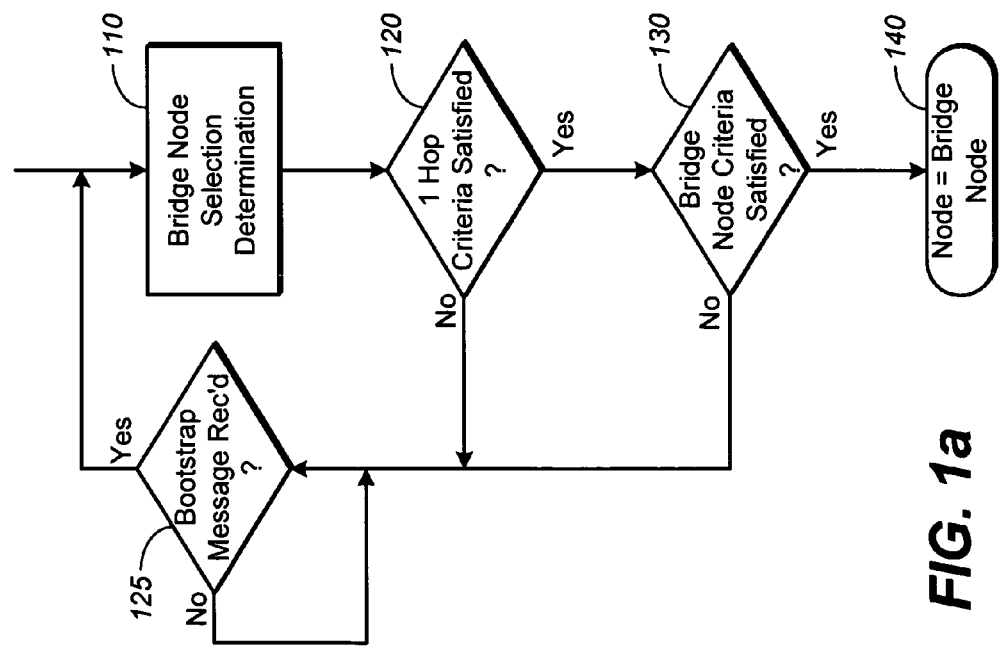
FIG. 1(a) is a flowchart illustrating how to select a node as a bridge node in a channel group.

FIGS. 1(a) and 1(b) show the flowchart illustrating how to determine whether a node is a bridge node in a channel group and how to deselect a bridge node in a channel group. The nodes in the present invention may be any combination of hardware, firmware or software, having memory or residing in memory controlled by a processor, ASIC (Application Specific Integrated Circuit), FPGA (Field Programmable Gate Array) or the like. The hardware used in the present invention is preferably the SCA compliant JTRS Cluster 1 hardware.

Turning attention to FIG. 1(a), illustrating the steps for Bridge Node Selection Determination as run by a heuristic algorithmic software program, preferably a distributed heuristic software program run by the hardware associated with each node in the present invention. The software program can comprise firmware stored by the hardware associated with each node. The heuristic program performs a set of rules for selecting the bridge node from the set of all nodes that are to be bridged. Block 110 is labeled "Bridge Node Selection Determination" and is where the program beings. The bridge node selection heuristic program of the present invention, following the disclosure set out herein, find an optimal slot allocation for Inter-Channel Bridge Node communication for Time Division Multiplexing (TDM) in a TDMA MANET network.

The first step is for the node that is a candidate for promotion to a Bridge node (a "candidate node"), a node X in Channel Group #M, to listen to all bootstrap messages transmitted by of all its "1 hop" neighbors (neighboring nodes that can be reached directly by the candidate node, with no need to pass through another node; two nodes that are one hop apart are within direct RF connectivity or range of each other). The term "1 hop", and specifically 1 hop neighbor, is used to refer to all nodes that are within transceiver range. That is to say, a node can communicate with a 1 hop neighbor with a single transmission, and no multi-hop transmissions are required. Bootstrap messages are messages transmitted by the nodes during startup/initialization of a candidate node. Bootstrap messages are control messages that each node transmits at a specific periodicity. These messages are synonymous with HELLO BEACON messages, defined as where a node advertises its identity, but also include neighborhood information, which contain the following information data, which can be designated in FIG. 1(a) as decision block 120, labeled "1 Hop Criteria Satisfied?":

The Channel Group the node belongs in. The channel group can be a particular implementation of the nodes, having a particular frequency the nodes communicate with one another in the channel (e.g., in a SDR (Software Defined Radio), one channel can be one radio modulation scheme at a particular frequency, and a second channel can be a different radio modulation scheme at a second frequency). Channel Group refers to its Logical Channel. While all nodes will have a particular frequency hopping pattern, those that share the same Logical Channel or Channel Group will have the very same hopping pattern. Thus if two nodes are on the same CG (logical channel), they will have the same hopping frequency pattern and will be able to communicate with one another readily.

Whether or not the node is a bridge node to a neighboring Channel Group other than the Channel Group the node belongs to. The term "to a neighboring Channel Group" refers to any Channel Group other than the one the node is currently in, and is within Radio Frequency (RF)

range of the node in question. Therefore, referring to the drawings herein, a single node in a Channel Group #1, could have "neighboring Channel Groups #2, #3, and #4, etc. as long as these Channel Groups are within RF range of the node in Channel Group #1.

Whether or not the node is a potential bridge node, based on its ability to hear the bootstrap message of nodes in a Channel Group, other than the one it belongs to.

Whether or not the node is a potential bridge node, but is 1 hop away from an active bridge node to the neighboring Channel Group.

The neighboring Channel Group a node hears (other than its home (main) Channel Group).

If the "1 Hop Criteria" is not satisfied in decision block 120 of FIG. 1(a), then further bootstrap messages are monitored, as indicated by following the "No" branch to decision block 125 labeled "Bootstrap Message Rec'd?".

In the flowchart of FIG. 1(a), if the software (or firmware) of the distributed heuristic program run at each candidate node obtains all the above information regarding the "1 Hop Criteria", the heuristic program proceeds to the next step, following the "Yes" branch to decision block 130, labeled "Bridge Node Criteria Satisfied?", otherwise the heuristic continues to poll the candidate node to receive the requisite information. A node needs all the information above the determine whether to become a bridge node.

Figure 3:
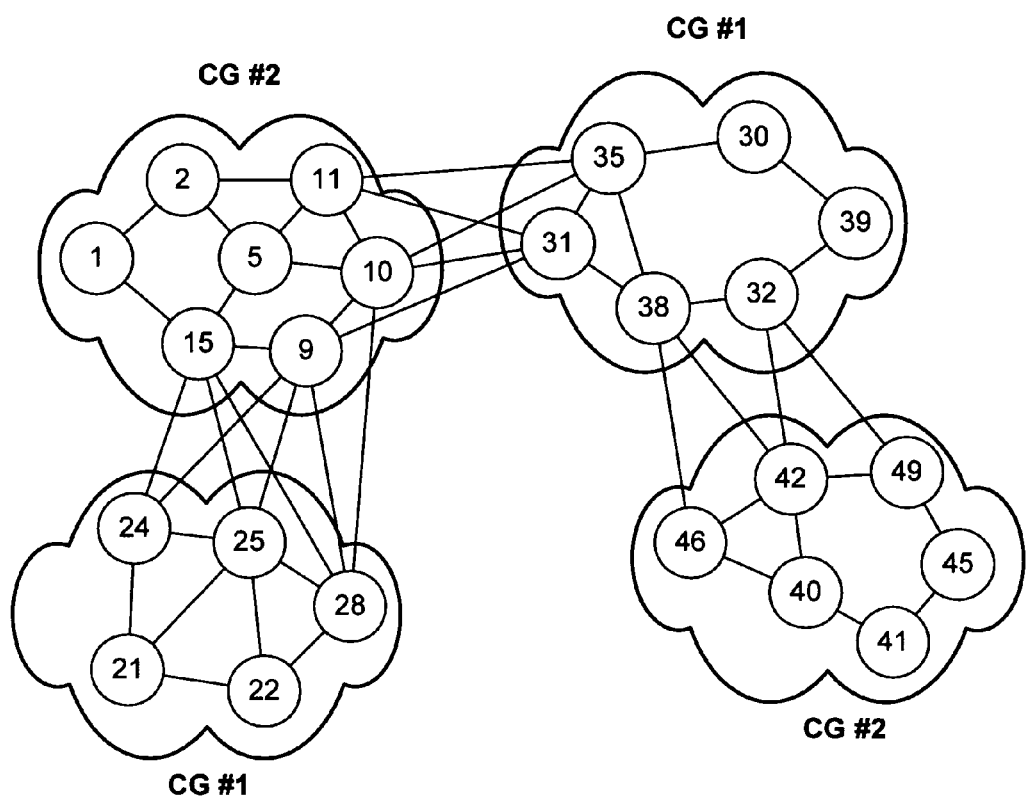
FIG. 3 through FIG. 6 illustrate the problem of selecting a bridge node for a particular topology, according to the teachings of the present invention.

In decision block 130, labeled "Bridge Node Criteria Satisfied?" in FIG. 1(a), the heuristic program will elect node X in Channel Group #M, as a bridge node to a Channel Group #N, based on the following criteria:

Node X has no existing good 1 hop neighbors (in Channel Group #M) that are currently existing Bridge Nodes to the same Channel Group #N (i.e., there may be multiple disconnected Channel Groups #Ns, see for example infra. in FIG. 3); "Good" refers to link quality sufficient to provide a bi-directional communication between two nodes, and, Node X is the lowest node ID within all its good 1 hop neighbors (in Channel Group #M) that is a potential bridge node to Channel Group #N. Node ID may be determined by assigning an alphanumeric label or from the digital representation of the Node X in bits, or the like.

If both the criteria outlined above are satisfied, the next step is to proceed to the box 140 labeled "Node=Bridge Node", and candidate bridge node X is promoted to an actual bridge node (an Active Bridge Node). Otherwise, the heuristic program is repeated, and a bootstrap message is polled for, as indicated by following the "No" branch of decision block 125 in FIG. 1(a).

Turning attention now to FIG. 1(b), there is outlined the flowchart for the steps involved in the deselection of any bridge node in a channel. The heuristic program associated with all nodes in the channel groups performs a set of rules for deselecting the bridge node. A node X in Channel Group #M will deselect itself as a bridge node to Channel Group #N based on the following criteria, as outlined in the box 150 labeled "Bridge Node Deselection Determination":

Node X no longer has any "good" 1 hop neighbor nodes in Channel Group #N, with "good" referring to a predetermined link quality of service sufficient to provide a satisfactory bi-directional communication between two nodes (decision box 155 labeled "Node X good 1 hop neighbors?"), and, Node X has more than "n" good 1 hop neighbors (in Channel Group #M) that are bridge nodes to Channel group #N (with "n">=1) (decision box 160 labeled "N Good 1 hop neighbors? (N>=1)").

If both of these criteria are satisfied, the bridge node is deselected as a bridge node and no longer is a bridge node, as indicated by the box 165 in FIG. 1(b) labeled "Node X Deselected", otherwise the program continues to query bootstrap messages, as indicated in decision block 170 labeled "Bootstrap Message Rec'd?" in FIG. 1(b), whether a bridge node should be deselected.

For both promotion of a node to a bridge node or deselection of a node from being a bridge node, suitable timers may be provided in the software and/or firmware associated with a node to determine selection and deselection during appropriate times and durations.

Attention now will be directed towards Inter-Channel Communications via Bridge Nodes. Once a node becomes an Active Bridge node it reserves a Traffic slot on the neighboring Channel Group, with the Traffic slot a particular time slot portion in the time domain of a TDMA bandwidth channel. The Traffic slot is used for inter-channel communication with one or more 1 hop neighbors of the neighboring Channel Group. All 1 hop neighbors will hear the Bridge node's Bootstrap and learn that it has reserved a Traffic slot in their Channel Group.

The Bootstrap message format for the bridge node is as follows:

ASR—Assigned Slots Record, each entry in this array is a 2 bit structure used to describe the state of a node during a specific Channel Group slot. The indices to the array of structures identify the specific Channel Group Traffic slot. The 2 bit structure represents 4 different states a node may have during the Channel Group slot, as follows.

State 00 indicates the node is self transmitting during this Channel Group Traffic slot time. To ensure the slot is available and no contention will occur a node shall only set a slot state to transmit after verifying all 1-hop neighbors have this slot state set to idle.

State 01 indicates the node is self receiving during this Channel Group Traffic slot time. A node will set the receive bits when only one of its 1-hop neighbors is transmitting during this slot time.

State 10 indicates there is a conflict between two or more nodes wanting to transmit during this Channel Group Traffic slot time. A node will set this slot state when two or more nodes are attempting to use the same slot time that are 2-hops apart. This slot state exposes the hidden terminal problem. When a transmitting node observes a conflict state published from one of its 1-hop neighbors in a slot time that the transmitting node is planning to transmit, it should not transmit but wait to receive a Broadcast Conflict Resolution Message from the 1-hop neighboring node in the slot header of its upcoming broadcast message.

State 11 indicates the node is idle during this Channel Group Traffic slot time. A node set the slot time to idle when it does not want to transmit and has no 1-hop neighbors that are transmitting.

The 2 bits of information of the ASR is per slot within a TDMA frame, of which there will be many slots.

Thus a Traffic ASR for a node would be an ASR with the ASR format above that demarcates the state of traffic between the node and other connected nodes communicating messages with it on the node's home channel group; while a Bridge ASR of a node would be an ASR with the ASR format above that demarcates state of messages passed between other nodes connected to the node on the node's Bridge Channel Group, during a particular time slot, as explained further herein. Traffic ASR advertise slot reservations of a node on its home Channel Group. Bridge ASR advertise slot reservations of a node on its bridge Channel Group. Each TDMA slot also has a destination node id associated which indicates the destination of a message. A single transmitting node will advertise the slot as self-tx (self-transmitting), while all 1 hop neighboring nodes of the transmitting node will advertise the slot as self-rx (self-receiving), including the destination of the message.

A Bridge node of the present invention reserves a Traffic slot in the neighboring Channel Group prior to having a specific destination for traffic, simply taking ownership of the Traffic slot. Therefore, the Bridge node should use its own node id as the dest_node_id (destination node id for the slot reservation) in the Bootstrap message, see the Bootstrap message format above (dest node id). The nodes in the neighboring Channel Group that hear the Bridge node make the Traffic reservation should stay on their Channel Group frequency and listen during the reserved Traffic slot. This allows the Bridge node to transmit without specifying a point-to-point link via the Bootstrap, which will take entirely too long.

Figure 2:
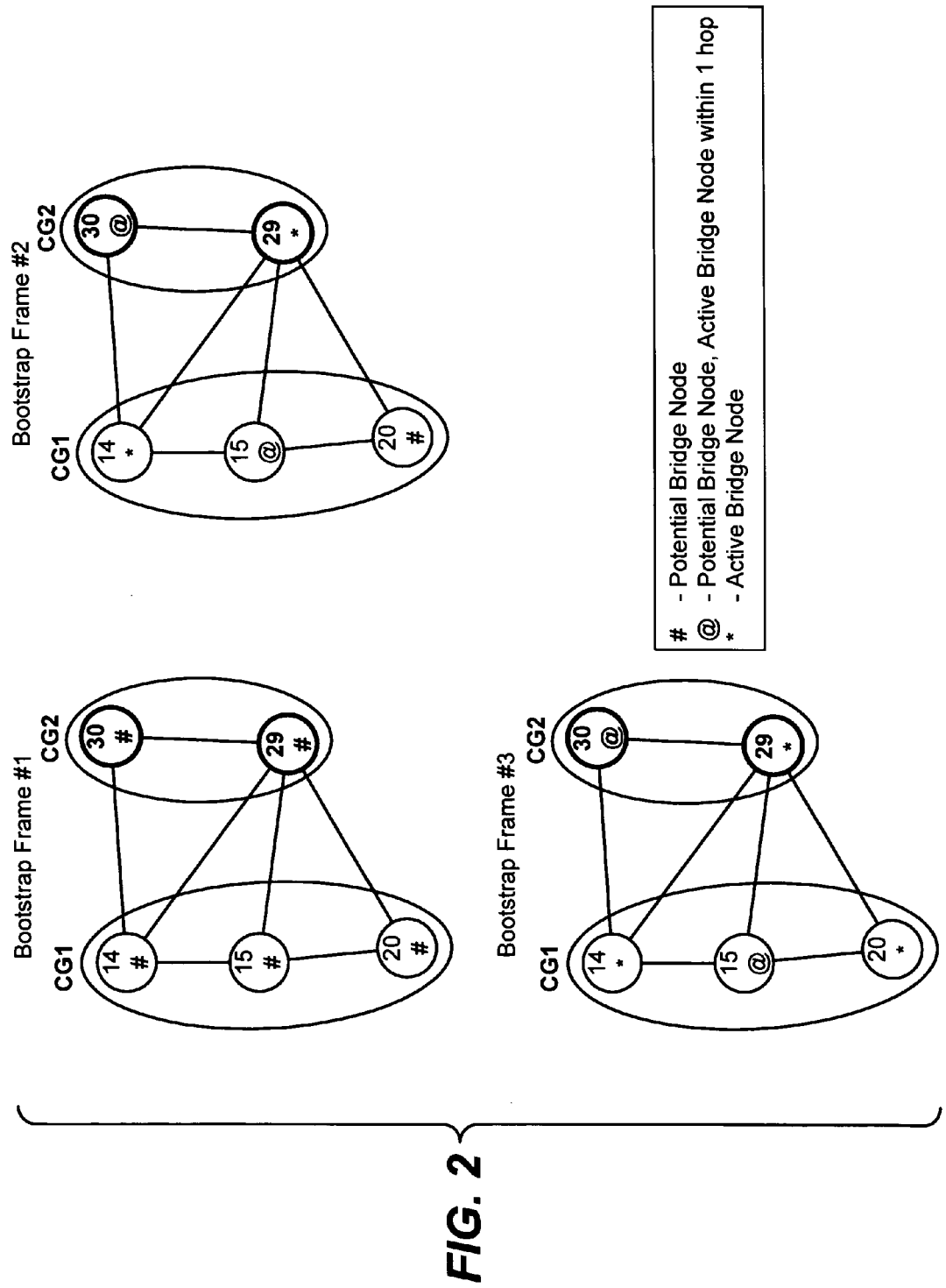
FIG. 2 is an illustrative example of the forming of an inter-channel communication topology according to the teachings of the present invention.

To illustrate the process of forming bridge nodes in the present invention, consider FIG. 2, an illustrative example of an inter-channel communication topology. To illustrate this process, consider the topology show in FIG. 2 labeled "Bootstrap Frame #1". Nodes 14, 15, and 20 in FIG. 2 belong to Channel Group #1; while, nodes 29 and 30 belong to Channel Group #2. Nodes 14, 15, and 20 will advertise in their Bootstrap messages they are potential Bridge nodes to Channel Group #2. Likewise, nodes 29 and 30 will advertise in their Bootstrap messages they are potential Bridge nodes to Channel Group #1. As indicated in the legend of FIG. 2, a potential Bridge Node is indicated by symbol "#"; a potential Bridge Node within 1 hop is indicated by symbol "@", and an active Bridge Node is indicated by symbol "*".

In the next Bootstrap epoch (period of time), labeled "Bootstrap Frame #2" in FIG. 2, node 14 will advertise it is the Active Bridge node to Channel Group #2. Node 15 will defer to node 14 and set its Bootstrap message to indicate it is a potential Bridge node with an Active Bridge node to CG2 (Channel Group #2) within 1 hop.

Once the Bootstrap message is heard from node 15, node 20 will elect itself an Active Bridge node to CG2, as indicated in FIG. 2 where labeled "Bootstrap Frame #3". In Channel Group #2 node 30 will defer to node 29 and set its Bootstrap message to indicate it is a potential Bridge node with an Active Bridge node to CG2 within 1 hop. Node 29 will advertise it is the Active Bridge node to Channel Group #1.

Next consider the two special 'pathological' topologies of FIG. 3 through FIG. 6, and FIG. 7, which are special topologies that require potential bridge nodes to ascertain additional topological information. Specifically, if 1 hop neighbors belonging to the same Channel Group number and share the same neighbors, then they are truly in the same Channel Group; if not, then they are effectively not in the same Channel Group but simply share the same Channel Group number. Thus two nodes could be in the same connected graph, say five hops apart and be in the same Channel Group, but do not share neighboring nodes. These two nodes would be far enough apart that they are treated as though they are in different CGs, that is they both deserve their own Bridge nodes if possible. Further regarding nodes forming a MANET, if nodes have the same CG number and do not have to reach one another by traversing another node in a different CG, the nodes are non-disjoint CG nodes, whereas if the nodes have to reach one another after first traversing another node in a different CG (e.g. a bridge node), the nodes are disjoint CG nodes. Non-disjoint CG nodes have the same channel group number, while disjoint CGs can have any channel group number. Regardless of CG number, it is true that nodes having the same CG can occupy the same communication channel (logical channel), and can communicate with one another readily, e.g., say for security purposes a predetermined frequency hopping pattern is employed, then the nodes in the same CG will all have the same predetermined hopping pattern.

Thus a Channel Group number is simply an number designating a Channel Group, which may be a non-disjoint or a disjoint CG. Further, two or more Channel Groups of a MANET (e.g., a pair of disjoint Channel Groups) can occupy the same communication channel group, e.g. due to spatial reuse.

Consider the topology of FIGS. 3 through 6, which demonstrates the need for a potential Bridge node suitably placed. In the topology shown in FIG. 3 there are multiple Channel Groups CG #1 and multiple Channel Groups CG #2, interspersed between each other. The example of FIG. 3 demonstrates the need for a potential Bridge node of a Channel Group N to know if one of its 1 hop neighbors is a Bridge node to the same Channel Group CG N, as mentioned above in the rules for determining bridge nodes. For proper Bridge node determination, a potential bridge node in Channel Group N must share its view of the neighboring Channel Group M topology with its 1 hop potential Bridge node neighbors in its home Channel Group N. This information is directly available from the Bootstrap messages, as each node transmits to their 1 hop and 2 hop neighbors (i.e., 2 hop neighbors are neighbors that can be communicated with by a node with exactly one intermediate node) that belong to the same Channel Group. As Bootstrap messages are received, a potential Bridge node shall construct and/or update a Bridge Neighbor List (BNL), which may be stored in memory, consisting of all 1 hop neighbors within the neighboring Channel Group and their 1 hop and 2 hop neighbors. BNL lists for the node discussed herein are shown in curly parenthesis in FIG. 4.

If two entries within the BNL have any intersection then these two entries belong to the same Channel Group. For purposes of clarity, consider the determination of Bridge node for Channel Group CG #2, that is, bridging between the two Channel Groups (labeled CG#1 in FIG. 3 through FIG. 6). As can be seen for example in FIG. 4, the potential Bridge nodes in CG#2 are 15, 9, 10, and 11, with the heavy dark line links that will connect to the neighboring Channel Groups and the associated BNL for each potential Bridge node.

Figure 4:
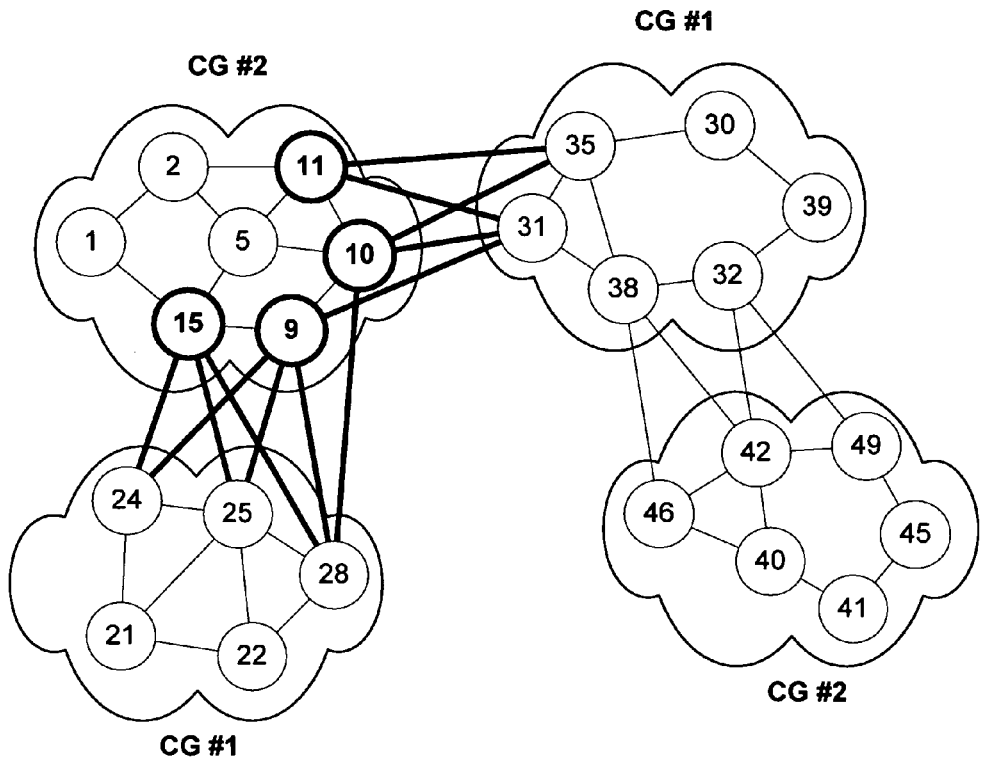

Taking the intersection of the BNL entries for node 9, the program of the present invention notes that nodes 24, 25, and 28 all belong to the same Channel Group CG #1, as each of these entries has at least one node in common. Node 31 belongs to a different Channel Group CG #1 because it has no nodes in common with nodes 24, 25, or 28. Taking the intersection of the BNL entries for node 15, the program of the present invention notes that nodes 24, 25, and 28 all belong to the same Channel Group CG #1, as each of these entries has at least one node in common. Taking the intersection of the BNL entries for node 10, the program of the present invention notes that nodes 31 and 35 belong to the same Channel Group CG #1, as each of these entries has at least one node in common. Node 28 belongs to a different Channel Group CG #1 because it has no nodes in common with nodes 31 or 35. Taking the intersection of the BNL entries for node 11, the program of the present invention notes that nodes 31 and 35 belong to the same Channel Group CG #1, as each of these entries has at least one node in common. Therefore one can conclude that nodes 9 and 10 both connect two disjoint Channel Groups CG #1, while nodes 15 and 11 each connect to a separate but individual Channel Group CG #1, as shown in FIG. 4. In this context "disjoint" indicates if the CGs are connected. That is, if there are 2 CG #1 that are disjoint, then there are at least two nodes, one in each CG that are not reachable without traversing another CG. Disjoint CGs can have any channel group number. Non-Disjoint CGs have the same CG number.

Next, each potential Bridge node transmits via Broadcast while in Broadcast mode a cumulative BNL to their 1 hop neighbors. Broadcast is a single transmission addressed and sent to all 1 hop neighbors; e.g., a broadcasting of messages undertaken by nodes periodically, similar to the Bootstrap message at startup. All nodes that belong to the same Channel Group, as describe above, will be grouped together, such as nodes 24, 25, 28 and their respective 1 hop and 2 hop neighbors. In the example of FIG. 4, nodes 9 and 10 will have two Channel Group BNL entries in the Broadcast; nodes 15 and 11 will have one Channel Group BNL. Once a node hears the BNL from its 1 hop neighbors, it can determine which neighboring Channel Group to bridge.

Figure 5:
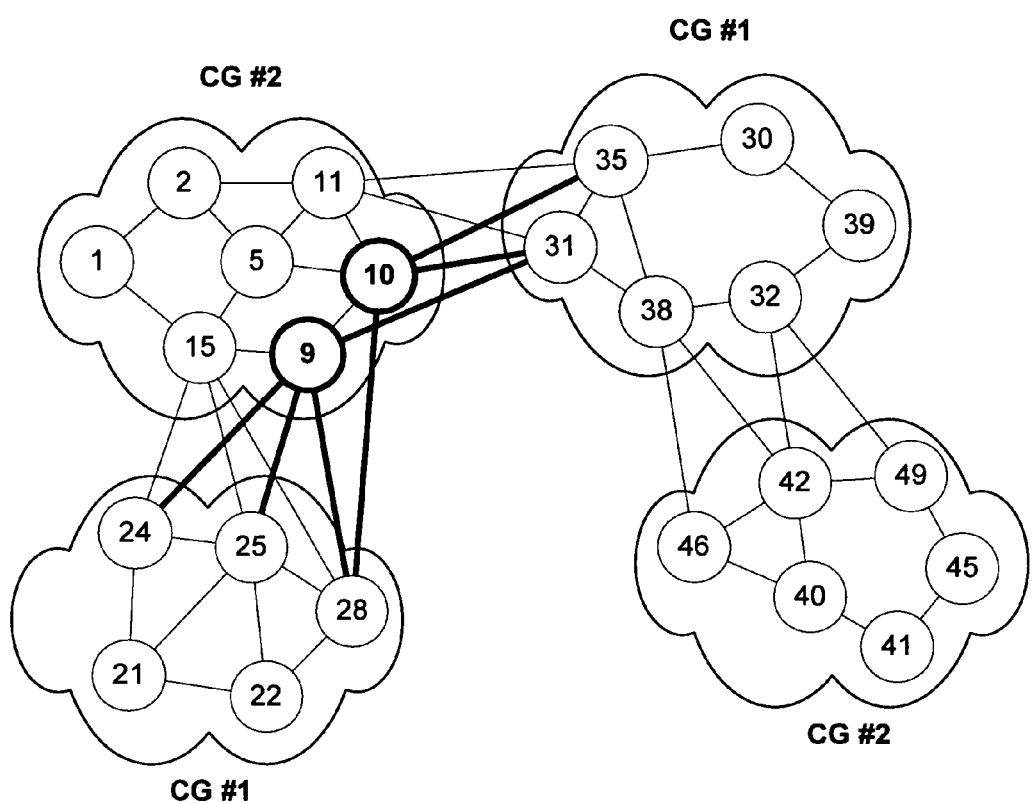

As seen in FIG. 5, node 9 receives the BNL from node 15, and determines that it can bridge the same CG #1 as node 15. Likewise, node 9 receives the BNL from node 10, and determines that it can bridge the same two CG #1 Channel Groups as node 10. Therefore, node 9 will be selected to bridge CG #1, comprising nodes 24, 25, and 28, because node 9 has greater degree of connectivity to this CG #1 than the CG #1 containing node 31. Node 9 will then announce itself as an Active Bridge node of CG #1 in the Bootstrap followed by a Broadcast BNL from node 9 specifying its active BNL entry to be that containing node 24, 25, and 28. The Broadcast BNL of an Active Bridge node contains routing information that is necessary for proper routing across Channel Group boundaries. The BNL list should be pushed up to Link Layer (i.e., OSI layer 2, the data link layer) for propagation, through the Channel Group routing update messages.

As shown in FIG. 5, node 15 will defer to node 9, as node 9 is 1 hop away from node 15 and bridges to the same Channel Group CG #1 that node 15 is a potential Bridge node. Likewise, node 11 will defer to node 10, as node 10 is 1 hop away from node 11 and bridges to the same Channel Group CG #1 that node 11 is a potential Bridge node.

Figure 6:
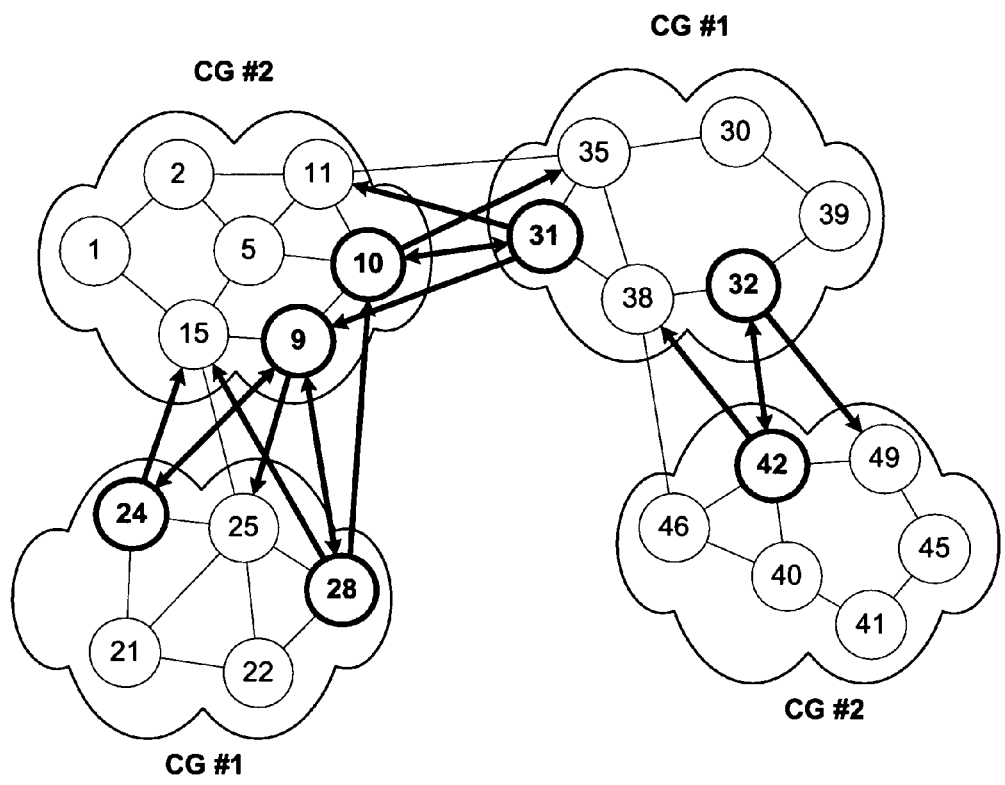

Finally, once all potential Bridge nodes have run similar processing there is left the Bridge node selections 9, 10, 24, 28, 31, 32, and 42, as shown in FIG. 6, with heavy lines showing the Bridge links between neighboring Channel Groups.

Figure 7:
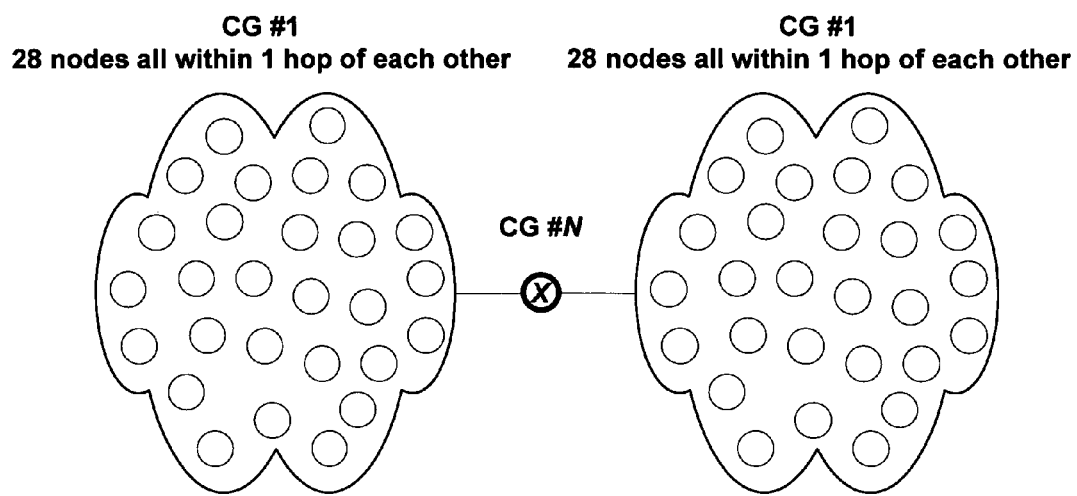
FIG. 7 illustrate special topologies that require additional topological information to select a bridge node, according to the teachings of the present invention.

Next consider how bridge nodes are selected for a second topology as shown in FIG. 7. The topology in FIG. 7 supposes that there are two disjoint Channel Groups (CG #1) potentially connected via a single node X. If both Channel Groups CG #1 can include node X into their Channel Group then the two disjoint Channel Groups will become one connected Channel Group, CN #1. However, if either of the two CG #1 can not include node X, then node X must occupy a different Channel Group, say CG #N. Node X will then follow the same processing as above in the previous figures, FIGS. 3 through 6.

Node X will construct a BNL for all 1 hop neighbors of both Channel Groups CG #1. It will be concluded by the heuristic program, as described in the previous example, that there exists two disjoint CG #1 Channel Groups. Node X has no other potential Bridge nodes to either Channel Group CG #1. Therefore, node X will bridge between both Channel Groups (CG #1) by selecting a communications link that will satisfy all 1 hop neighbors on both Channel Groups. If this can not be accomplished, then node X shall create two separate bridges and reserve two slots, one for each individual CG #1, for communications between the disjoint Channel Groups. Thus the bridge node of the present invention reserves two slots in the TDMA frame for transmission of communications if there are disjoint Channel Groups, and reserves one slot if the Channel Groups are not disjoint.

In the present invention, all transmissions from a Bridge node to 1 hop neighbors in a neighboring Channel Group are unicast messages. That is, if a broadcast or multicast transmission needs to traverse from one Channel Group to a neighboring Channel Group via a Bridge node, it shall be sent to a specific node as a unicast message with the appropriate broadcast or multicast qualifier embedded. Once the unicast message is received successfully, the 1 hop neighboring node will transmit the message as a broadcast or multicast message as appropriate.

A MANET according to the teachings of the present invention uses a bi-directional link established via the bridge node protocol taught herein. Once a Bridge node is selected via the Bridge Node Determination, it begins communications with 1 hop neighboring nodes in the neighboring channel group as needed, based on the best route to the destination. Bi-directional communications over the link connecting two neighboring channel groups may be accomplished by the Bridge Node Communications Protocol taught herein.

Thus a Bridge node makes a self reservation of a Traffic slot on the neighboring channel group. A self reservation is made by reserving the Traffic slot to ones self, i.e., the dest node id field (destination node id for the slot reservation) of the Traffic ASR field (see Bootstrap message format herein) is set to the node id of the Bridge node making the reservation (i.e. 'self tx'). In this way the Bridge node owns the slot and can use it to communicate with any of the 1 hop neighbors in the neighboring channel group as a unidirectional link. Note that Potential Bridge nodes have no prior communication with a neighboring Channel Group and therefore have no idea of link quality. Therefore, link quality for potential Bridge nodes can be transmitting in their Bootstrap message. A provisional parameter will indicate a percent usage of the Traffic slot allocated by the Bridge node for bidirectional communications to and from the Bridge node. This will allow the Hop-By-Hop (HBH) ACK/NACK, a positive acknowledgement of successfully receiving a message from a 1 hop neighboring node, the message to be sent directly to the Bridge node in an efficient manner without the need of a HBH proxy agent. The cell headers transmitted from the Bridge node will indicate the slot for the receiving node to use for bidirectional transmissions.

As an example consider a percentage of 80/20 Traffic slot utilization between a Bridge node (node id 2) and a 1 hop neighbor (node id 10). Then the Bridge node would utilize 80% of the Traffic slot for transmitting while allowing 20% of the Traffic slots available for the destination node to respond with HBH AC/NACK, etc., or other control messages, as show in FIG. 8. Although the Bridge node is making the reservation as though it is a unidirectional link, the protocol requires agreement of collision-free transmissions from the Bridge node to the 1 hop neighbor, and from the 1 hop neighbor to the Bridge node. Therefore, when a Bridge node allocates a slot for inter-channel communications, it must ensure all 1 hop neighbors in the neighboring channel group agree to listen during that slot time, and are able to transmit back to the Bridge node during that same time slot. In this way the present invention utilizes unidirectional links in a kind of pseudo bidirectional manner, which facilitates a deterministic response that potentially creates faster transmissions.

Thus the present invention determines disjoint neighboring Channel Groups that use the same Channel Group identifier. If disjoint neighboring Channel Groups using the same identifier exist, then the protocol of the present invention determines an Inter-Channel Bridge Node for each, and utilizes unidirectional links in a bidirectional manner, facilitating deterministic response for Hop-By-Hop Acknowledgments.

Figure 8:
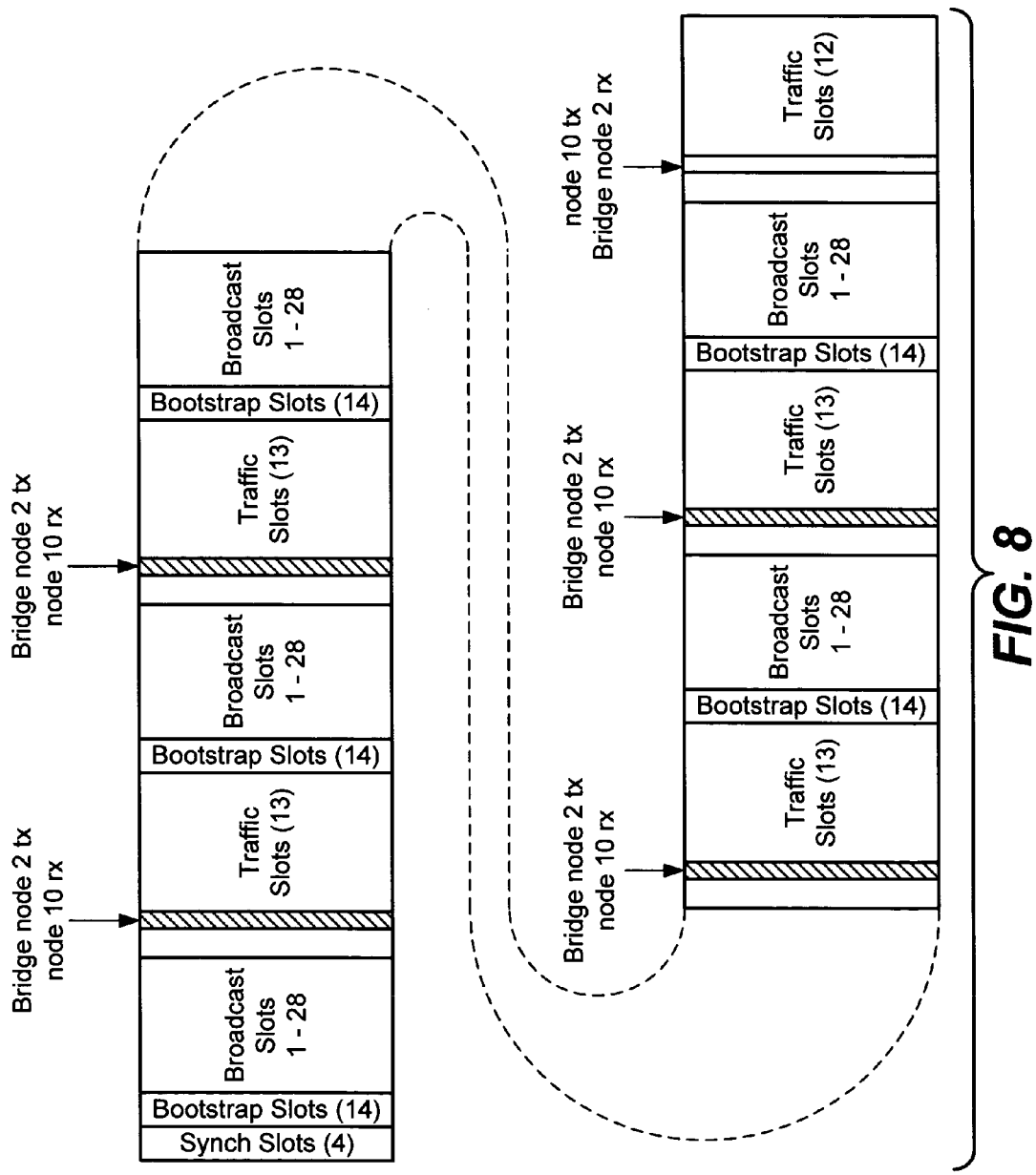
FIG. 8 is a diagram of the TDMA Frame format for a bi-directional link via bridge node according to the teachings of the present invention.

FIG. 8 shows a representative TDMA unidirectional link message frame format used by bridge nodes to communicate with a different channel group. As shown in FIG. 8, the message frame may comprise 4 Synch Slots (of 4 time units width), Bootstrap Slots (of 14 time units width), Traffic Slots (of 13 time units width), with for example bridge node 2 transmitting to node 10, and a transmission acknowledgement from node 10 received by bridge node 2, as indicated in FIG. 8, and so on, in a repeating pattern.

Figure 9A:
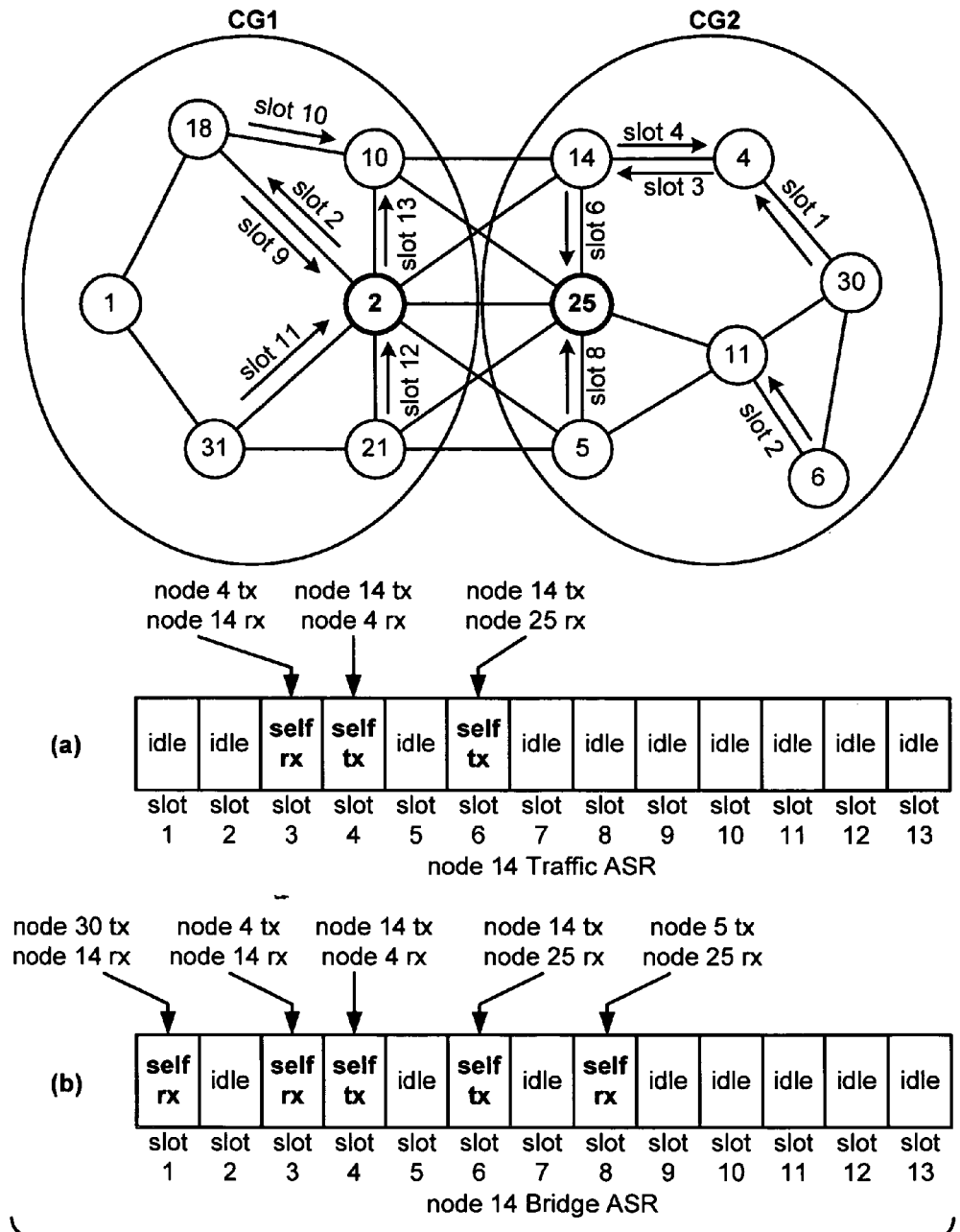
FIGS. 9 and 10 are diagrams of a particular topology according to the present invention, and the channel group idle time slot determination for the TDMA scheme for such a topology.
Figure 9B:
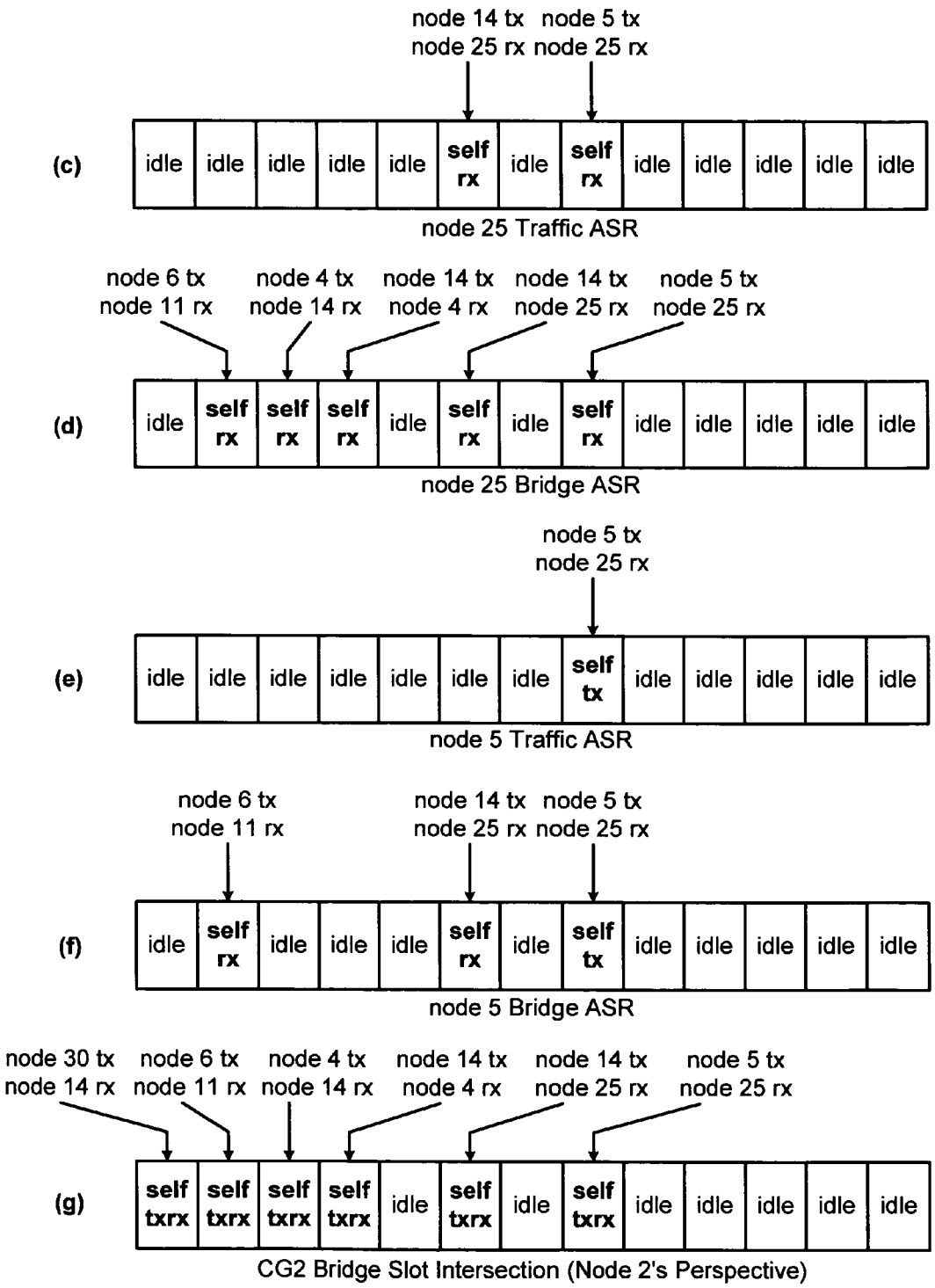
Figure 10:
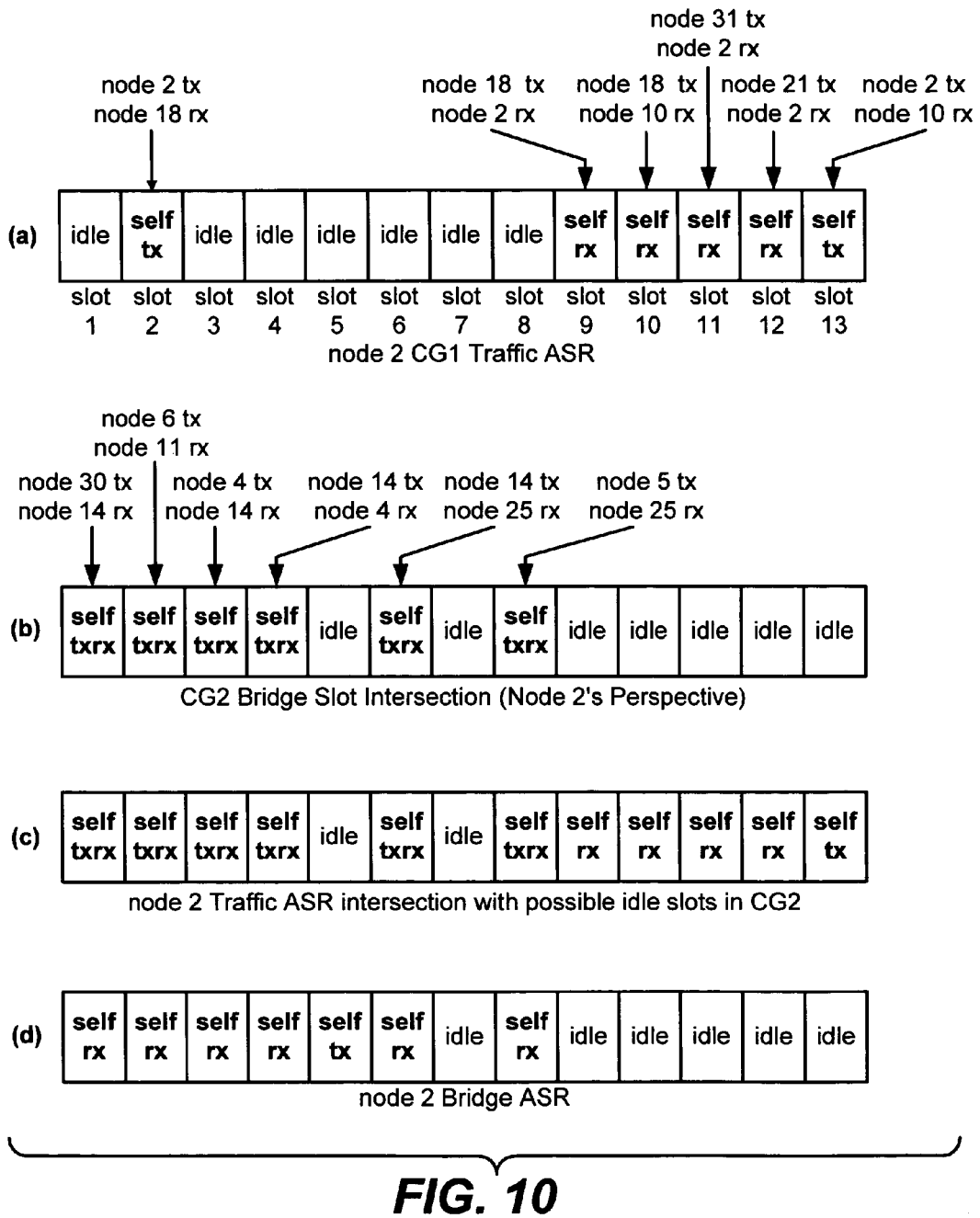

The present invention allows for a bridge node slot allocation scheme in TDMA, as illustrated in FIG. 9 and FIG. 10. As can be seen in the figures, each node constructs, using the heuristic software program associated with it, a series of TDMA time slots, using data from other nodes such as Traffic ASR and Bridge ASR, as well as BNL data, to form a series of 13 discrete time slots over which Time Division Multiplexing (TDM) may be performed.

In FIG. 9, a Bridge node selects a Traffic slot on the neighboring channel group based on information gleaned from its own Traffic ASR (Traffic Assigned Slots Record) and the Bridge ASRs of all 1 hop neighboring nodes in a neighboring channel group. Every Potential Bridge node in a neighboring channel group will advertise slots in their Bridge ASR that are available for collision-free bidirectional communications between the Bridge node and the Potential Bridge nodes of the neighboring channel group. The Bridge node then takes the intersection of the idle slots from all Potential Bridge nodes ASRs and its own Traffic ASR to determine the common set of intersecting idle slots to reserve for substantially optimal inter-channel communication. As an example, consider the topology of FIG. 9 and the ASRs therein; assume node 2 is the Bridge node of channel group CG1. Bridge node 2 listens to the Traffic and Bridge ASRs of all 1 hop Potential Bridge nodes in channel group CG2; nodes 14, 25, and 5. Bridge node 2 determines from these ASRs a common set of idle slot times (IST) for all 1 hop neighbors in channel group CG2. Bridge node 2 then overlays its own Traffic ASR with the CG2 IST (idle slot times) to select an idle Traffic slot that does not conflict with its own Traffic ASR. Bridge node 2 then selects one of the possible non-conflicting slot times on CG2. From FIG. 9 it is seen that slots 5, 7, 9, 10, 11, 12, 13 are all common idle slots in CG2 shared between nodes 14, 25, and 5.

More particularly FIG. 9, parts (a), (c) and (e), labeled "node 14 Traffic ASR", "node 25 Traffic ASR", and "node 5 Traffic ASR", respectively, shows the Traffic ASR as seen by nodes 14, 25 and 5, respectively. FIG. 9, parts (b), (d) and (f) show the Bridge ASR as seen by nodes 14, 25 and 5, from each respective node's perspective. Finally, FIG. 9, part (g) shows the Bridge Slot Intersection for Channel Group #2, as seen from Node 2's perspective. As can been seen from FIG. 9, the idle slots 5, 7, 9, 10, 11, 12, 13 are all common idle slots in CG2 shared between nodes 14, 25, and 5, as seen from Node 2's perspective. By way of example, in FIG. 9 (g) the notation "node 30 tx node 14 rx" is because, from Node 2's point of view, Node 30 is transmitting to Node 4 during slot 1 of the TDMA scheme, and Node 14 must mark this slot as occupied (as a receiving (rx) slot) because any other communication in this slot would cause a collision.

Turning attention now to FIG. 10, which is further in reference to the topology shown in FIG. 9, a further elaboration present invention TDMA scheme is shown. In FIG. 10 it is seen that Bridge node 2 has slots 1, 3, 4, 5, 6, 7, and 8 as idle slots for channel group CG1 in its Traffic ASR (see FIG. 10, part (a), labeled "Node 2 CG1 Traffic ASR"). Therefore, Bridge node 2 can use anyone of these slots that are common with the IST of CG2.

Further, from Node 2's perspective, the channel group CG2 has a TDMA Traffic ASR (a set of ASRs, with each individual ASR being 2 bits, as indicated above, which indicate the status of that specific slot), with the Traffic ASR time slot as seen by Node 2 having idle slots 5, 7, 9, 10, 11, 12, 13, (see FIG. 10, part (b), labeled "CG2 Bridge Slot Intersection (Node 2's Perspective)").

Taking the intersection of idle slot times (IST), IST CG2 and IST CG1, (see FIG. 10 part (a) and FIG. 10, part (b)), it can be seen that slots 5 and 7 are the possible common idle slots times between CG1 and CG2 (see FIG. 10, part (c), labeled "node 2 Traffic ASR intersection with possible idle slots in CG2"). In the example of FIG. 10, as shown in FIG. 10 part (d), labeled "node 2 Bridge ASR", Bridge node 2 has selected slot 5 in CG2 for inter-channel communications and sets the 'self tx' bit for slot 5 in its Bridge ASR for CG2, while slot 7 is idle (just as equally slot 7 instead of slot 5 may have been chosen for inter-channel communications).

The Assigned Slot Reservation (ASR) indicates the reservations of the slots in the TDMA scheme of the present invention that a node has made or learned from all its 1 hop neighbors. If a node reserves a slot for transmission, then it will set the ASR bits for that specific slot to self tx, as in the example of FIGS. 9 and 10. If a node A hears a 1 hop neighboring node B indicate it will be transmitting in a specific slot, then node A will set the ASR bits to self rx because it can not transmit while node B is transmitting or there will be a collision. If no node has reserved a specific slot, then the ASR bits for that slot are set to idle. Bridge node 2 is able to communicate with any of the 1 hop Potential Bridge nodes of CG2 via slot 5 of CG2, and any of the Potential Bridge nodes of CG2 are able to communicate with Bridge node 2, as described in the Bridge Node Protocol, via slot 5 of CG2.

In the example of FIGS. 9 and 10, if slot 5 is chosen by Bridge Node 2 in its Bridge ASR for inter-channel communications with channel group CG2, the time slot usage for this slot 5 is then divided between the transmitted bridge node (Bridge Node 2) and any receiving node (e.g., nodes 14, 25 or 5) in the neighboring channel.

It is intended that the scope of the present invention extends to all such modifications and/or additions and that the scope of the present invention is limited solely by the claims set forth below.

We claim:

1. An inter-channel communications bridge node MANET architecture, comprising:
   a plurality of nodes forming a first communications channel group (CG);
   a plurality of nodes forming a second communications channel group (CG);
   a software program run by a processor, said software program associated with each of said nodes;
   at least one bridge node selected from said first and second communication channel groups (CGs) nodes by said program, said bridge node forming a bridge for communication between said nodes of said first and second channel groups;

said nodes of said first and second channel groups communicating with one another via said bridge node according to said software program, said plurality of first and second channel group nodes form a mobile ad-hoc network (MANET), said nodes from said first CG passing and receiving messages to and from said nodes from said second CG according to Time Division Multiple Access (TDMA) via said bridge node, each node having time slots in a time domain for TDMA, said bridge node is selected by said software program from "1 hop" neighboring nodes from said nodes in said first and second channel groups, said nodes in said first and second channel groups transmit messages at a predetermined periodicity according to said software program, said bridge node reserves a time slot in said TDMA for sending and receiving said messages from said first and second CGs, a plurality of Potential Bridge Nodes comprising "1 hop" neighboring nodes to said bridge node, said Potential Bridge Nodes having a plurality of time slots in the time domain for TDMA of said messages, said Potential Bridge time slots having idle slots suitable for transmission of inter-channel messages between said first and second CGs, said software program determines a common set of intersecting idle slots between said Potential Bridge Nodes time slots to reserve for inter-channel communication by said bridge node, said nodes in said first and second channel groups transmit bootstrap messages at a predetermined periodicity according to said software program; and, based upon information from a Traffic Assigned Slots Record of the bridge node and further, based upon information from Bridge Assigned Slots Records of each of the bridge node's one-hop neighboring nodes, said bridge node reserves a traffic slot in the time domain of said TDMA for sending and receiving said messages from said first and second CGs, prior to having a specific point-to-point destination for the messages, by taking ownership of a predetermined time domain traffic slot portion in said TDMA time domain and using a node ID of the bridge node as a bootstrap message destination node ID without specifying a point-to-point link in the bootstrap message, wherein a provisional parameter indicates a percent usage of said reserved traffic slot allocated by said bridge node for bi-directional communications to and from said bridge node.

2. The architecture according to claim 1, wherein:
said bridge node is selected from said nodes according to heuristic software of said software program.

3. The architecture according to claim 2, wherein:
said heuristic software selects said bridge node from said nodes in said first and second channel groups that are "1 hop" neighbors to one another.

4. The architecture according to claim 3, wherein:
said nodes in said first and second channel groups transmit bootstrap messages at a predetermined periodicity;
said heuristic software selects said bridge node from at least one candidate bridge node selected from said nodes in said first and second channel groups according to a set of rules, said rules selected from the group consisting of: whether the candidate bridge node is already a bridge node to a neighboring Channel Group, said neighboring Channel Group being the Channel Group other than the Channel Group the candidate bridge node belongs to; whether the candidate bridge node can hear the bootstrap message of nodes in a Channel Group other than the Channel Group the candidate bridge node belongs to; or, whether the candidate bridge node is "1 hop" away from another active bridge node of said first and second Channel Group.

5. The architecture according to claim 4, wherein:
said heuristic software further selects said candidate node according to heuristic rules comprising:
the candidate bridge node has no existing "good" "1 hop" neighbor nodes of the same CG from said first and second CG that the candidate bridge node resides in, said "good" "1 hop" neighbors being bridge nodes to the other CG of said first and second CGs that the candidate bridge node resides in, wherein "good" refers to link quality sufficient to provide a predetermined level of bi-directional communication between two nodes, and,
said candidate bridge node has the lowest "node ID" within all its said "good" "1 hop" neighbors in the same CG the candidate bridge node resides in.

6. The architecture according to claim 1, wherein:
said bridge node is selected as a bridge node from said plurality of nodes and deselected as a bridge node according to a heuristic program performed by said software;
said heuristic program deselects said bridge node from said nodes in said first and second channel groups, so said bridge node is no longer a bridge node, according to heuristic rules comprising:
said bridge node no longer has any existing "good" "1 hop" neighbor nodes in the other CG to the CG said bridge node resides in, from said first and second CGs, wherein "good" refers to link quality sufficient to provide a predetermined level of bi-directional communication between two nodes, and,
said bridge node has more than "N" "good" "1 hop" neighbor nodes, in the existing CG said bridge node resides in, that are themselves bridge nodes to the other CG from said first and second CGs that the bridge node resides in, with "N">=1.

7. The architecture according to claim 1, wherein:
said software program ensuring all "1 hop" neighbor nodes, in the other CG to the CG said bridge node resides in, listen during the predetermined time domain of said traffic slot for messages from said bridge node.

8. The architecture according to claim 1, wherein:
said Potential Bridge Node time slots comprise traffic time slots and bridge time slots, each having idle slots;
wherein said software program determines said common set of intersecting idle slots by finding a set of Potential Bridge Node Idle Time Slots that are common to all said plurality of Potential Bridge Nodes traffic time slots and bridge time slots;
said bridge node having a plurality of traffic time slots having idle slots; and,
said software program determining the idle slots according to TDMA for said bridge node inter-channel communication between CGs by finding the common idle slots between said Potential Bridge Node Idle Time Slots and said bridge node traffic idle time slots.

9. The architecture according to claim 1, wherein:
said bridge node is selected by said software program according to data received from said "1 hop" neighboring nodes from said nodes in said first and second channel groups;
said nodes in said first and second channel groups transmit messages at a predetermined periodicity according to said software program, each of said nodes having a plurality of time slots to communicate data according to said TDMA;

each of said nodes having a Bridge Neighbor List (BNL), stored by said software program, consisting of all "1 hop" neighboring nodes within each other of said first and second CGs that each of said nodes resides in, and the "1 hop" and "2 hop" neighbors of said neighboring nodes;

said software program determines said bridge node by selecting a node having the greater degree of connectivity according to each of said BNL.

10. The architecture according to claim 9, wherein:

each of said nodes in said CGs is identified by a channel group number (CGN), with said software program classifying said nodes by their CGN according to the intersection of said nodes BNL and the degree of common nodes shared by said nodes according to said BNL.

11. The architecture according to claim 10, wherein said program classifies said nodes according to each of said CGN as belonging to either a disjoint CG or a non-disjoint CG.

12. The architecture according to claim 11, wherein:

said program reserving in said bridge node time slot two time slots in the frame of said TDMA for communication between nodes that belong to two disjoint Channel Groups having the same CGN.

13. A method for an inter-channel communications bridge node MANET TDMA protocol, comprising the steps of:

providing a plurality of nodes forming a first communications channel group (CG);

providing a plurality of nodes forming a second communications channel group (CG);

said first and second channel groups form a mobile ad-hoc network (MANET), each of said nodes controlled by a software program run by a processor;

selecting at least one bridge node from said first and second communication channel groups, said bridge node forming a bridge between said first and second communication channel groups, wherein said bridge node is selected from "1 hop" neighboring nodes of said nodes in the first and second channel groups via the software program;

allowing communication of data between the nodes of said first and second communication channel groups via said bridge node during predetermined time slots via Time Division Multiple Access (TDMA);

transmitting messages to and from said nodes in said first and second channel groups at a predetermined periodicity according to said software program;

based upon information from a Traffic Assigned Slots Record of the bridge node and further, based upon information from Bridge Assigned Slots Records of each of the bridge node's one-hop neighboring nodes, reserving in said bridge node a time slot in said TDMA for sending and receiving said messages from said first and second CGs;

having a plurality of Potential Bridge Nodes comprising "1 hop" neighboring nodes to said bridge node, said Potential Bridge Nodes being in the other CG to the CG of said bridge node, each of said Potential Bridge Nodes having a plurality of time slots in the time domain for TDMA of said messages, said Potential Bridge Nodes time slots having idle slots suitable for transmission of inter-channel messages between said first and second CGs;

determining with said software program a common set of intersecting idle slots between said Potential Bridge Nodes time slots to reserve for inter-channel communication by said bridge node;

transmitting bootstrap messages from said nodes in said first and second channel groups at a predetermined periodicity according to said software program;

reserving a traffic slot of said bridge node in the time domain of said TDMA for sending and receiving said messages to and from said first and second CGs, prior to having a specific point-to-point destination for said messages, by taking ownership of a predetermined time domain traffic slot portion in said TDMA time domain and using a node ID of the bridge node as a bootstrap message destination node ID without specifying a point-to-point link in the bootstrap message, wherein a provisional parameter indicates a percent usage of said reserved traffic slot allocated by said bridge node for bi-directional communications to and from said bridge node; and having said software program ensure all "1 hop" neighbor nodes, in the other CG to the CG said bridge node resides in, listen during the predetermined time domain of said traffic slot for messages from said bridge node.

14. The method according to claim 13, further comprising the steps of:

selecting said bridge node using said software program that is heuristic;

selecting said bridge node from at least one candidate bridge node from the nodes in said first and second channel groups that are "1 hop" neighbors of one another, using said heuristic program according to a set of rules comprising the steps of:

determining whether the candidate bridge node is already a bridge node to a neighboring Channel Group, said neighboring Channel Group being the Channel Group other than the Channel Group the candidate bridge node belongs to;

determining whether the candidate bridge node can hear the bootstrap message of nodes in a Channel Group other than the Channel Group the candidate bridge node belongs to; and, determining whether the candidate bridge node is "1 hop" away from another active bridge node of said first and second Channel Group.

15. The method according to claim 14, further comprising the steps of:

selecting said bridge node from at least one candidate node using said heuristic program according to a set of rules comprising the steps of:

determining whether the candidate bridge node is already a bridge node to the candidate bridge node has no existing "good" "1 hop" neighbor nodes of the same CG from said first and second CG that the candidate bridge node resides in, said "good" "1 hop" neighbors being bridge nodes to the other CG of said first and second CGs that the candidate bridge node resides in, wherein "good" refers to link quality sufficient to provide a predetermined level of bi-directional communication between two nodes, and, determining which candidate bridge node has the lowest "node ID" within all its said "good" "1 hop" neighbors in the same CG the candidate bridge node resides in.

16. The method according to claim 13, further comprising the steps of:

selecting and deselecting said bridge node using said software program that is heuristic;

deselecting said bridge node from said plurality of nodes according to said heuristic program performed by said software, using said heuristic program according to a set of rules comprising the steps of:

ascertaining whether said bridge node no longer has any existing "good" "1 hop" neighbor nodes in the other CG to the CG said bridge node resides in, from said first and second CGs, wherein "good" refers to link quality sufficient to provide a predetermined level of bi-directional communication between two nodes, and, deselecting said bridge node if said bridge node has more than "N" "good" "1 hop" neighbor nodes, in the existing CG said bridge node resides in, that are themselves bridge nodes to the other CG from said first and second CGs that the bridge node resides in, with "N">=1.

17. The method according to claim 13, wherein:

said Potential Bridge Node time slots comprise traffic time slots and bridge time slots, each having idle slots;

determining said common set of intersecting idle slots by idle slots that are common to all said plurality of Potential Bridge Notes traffic time slots and bridge time slots, using said software program, comprising Potential Bridge Node Idle Time Slots;

said bridge node having a plurality of traffic time slots having idle slots; and, determining with said software program the idle slots for TDMA for said bridge node inter-channel communication between CGs by finding the common idle slots between said Potential Bridge Node Idle Time Slots and said bridge node traffic idle time slots.

18. The method according to claim 13, further comprising the steps of:

selecting said bridge node by said software program according to data received from said "1 hop" neighboring nodes from said nodes in said first and second channel groups;

transmitting messages from said nodes in said first and second channel groups at a predetermined periodicity according to said software program, each of said nodes having a plurality of time slots to communicate data according to TDMA;

storing each of said nodes Bridge Neighbor List (BNL), via by said software program, consisting of all "1 hop" neighboring nodes within the other of said first and second CGs that each of said nodes resides in, and the "1 hop" and "2 hop" neighbors of said neighboring nodes;

determining said bridge node by selecting a node having the greater degree of connectivity according to each of said BNL.

19. The method according to claim 18, further comprising the steps of:

identifying each of said nodes in said CGs by a channel group number (CGN), with said program classifying said nodes by their CGN according to the intersection of said nodes BNL and the degree of common nodes shared by said nodes according to said BNL.

20. The method according to claim 19, wherein said program classifies said nodes according to each of said CGN as belonging to either a disjoint CG or an non-disjoint CG.

21. The method according to claim 20, wherein:

reserving in said bridge node time slot two time slots in the frame of TDMA for communication between nodes that belong to two disjoint Channel Groups having the same CGN.

22. A MANET architecture comprising:

means forming a first communications channel (CC) comprising a first plurality of nodes;

means forming a second communications channel (CC) comprising a second plurality of nodes;

means for bridging said first and second communication channels; said means for bridging comprising at least one node selected from said first and second CC;

said first and second CC means communicating with one another via said bridging means;

means for processing associated with said first and second CC means;

said means for processing is programmable with a software program, said software program controlling said first and second CC means to pass and receive data to each other according to Time Division Multiple Access (TDMA); wherein, said software program controls the selection of said bridging node, and selects said bridging node from said first and second plurality of nodes of said first and second CC means that are "1 hop" neighbors to one another;

said plurality of nodes forming a mobile ad-hoc network (MANET);

said nodes of said first and second CC means transmit bootstrap messages, said bridging node reserves a slot in said TDMA for communication to and from said first and second CC means, said software program transmitting bootstrap messages from said nodes in said first and second channel groups at a predetermined periodicity;

based upon information from a Traffic Assigned Slots Record of the bridge node and further, based upon information from Bridge Assigned Slots Records of each of the bridge node's one-hop neighboring nodes, said software program reserving a traffic slot of said bridge node in the time domain of said TDMA for sending and receiving said messages to and from said first and second CC means, prior to having a specific point-to-point destination for said messages, by taking ownership of a predetermined time domain traffic slot portion in said TDMA time domain of said bridge node and using a node ID of the bridge node as a bootstrap message destination node ID without specifying a point-to-point link in the bootstrap message, wherein a provisional parameter indicates a percent usage of said reserved traffic slot allocated by said bridge node for bi-directional communications to and from said bridge node;

said software program ensures all "1 hop" neighbor nodes, in the other CC to the CC said bridge node resides in, listen during the predetermined time domain of said traffic slot for messages from said bridge node, said nodes of said first and second CC means transmit bootstrap messages, said bridging node reserves a slot in said TDMA for communication to and from said first and second CC means, said software program transmitting bootstrap messages from said nodes in said first and second channel groups at a predetermined periodicity;

a plurality of Potential Bridge Nodes comprising said "1 hop" neighboring nodes to said bridge node, said Potential Bridge Nodes being in the other CC to the CC of said bridge node, each of said Potential Bridge Nodes having a plurality of time slots in the time domain for TDMA of said messages, said Potential Bridge time slots having idle slots suitable for transmission of inter-channel messages between said first and second CC means;

said software program determining a common set of intersecting idle slots between said Potential Bridge Nodes time slots to reserve for inter-channel communication by said bridge node.

* * * * *